United States Patent [19]

Irwin et al.

[11] 3,729,386
[45] Apr. 24, 1973

[54] ORGANIC ISOCYANATE RECOVERY PROCESS BY DISTILLATION WITH A TAR-THINNING AGENT AND A STRIPPING AGENT

[75] Inventors: Carl F. Irwin, New Castle, Del.; William T. Muncaster, Woodstown, N.J.

[73] Assignee: E. I. du Pont de Nemours and Company, Wilmington, Del.

[22] Filed: Jan. 4, 1971

[21] Appl. No.: 103,734

Related U.S. Application Data

[63] Continuation-in-part of Ser. No. 39,779, May 22, 1970, abandoned.

[52] U.S. Cl. ............203/8, 203/49, 203/52, 203/57, 203/60, 203/62, 203/63, 203/67, 203/68, 203/69, 203/70
[51] Int. Cl. ............C07c 119/04, B01d 3/34
[58] Field of Search ............203/49, 52, 57, 62, 203/63, 60, 67, 68, 69, 71, 73, 8, 70; 260/453 SP, 453 PH

[56] References Cited

UNITED STATES PATENTS

| 2,884,360 | 4/1959 | Bloom et al. | 260/453 SP |
|---|---|---|---|
| 2,680,128 | 1/1954 | Slocombe et al. | 260/453 PH |
| 3,169,141 | 2/1965 | Kober et al. | 203/63 |
| 3,658,656 | 4/1972 | Adica et al. | 203/70 |
| 3,436,318 | 4/1969 | Glass | 203/52 |
| 3,259,555 | 7/1966 | Lankton et al. | 203/60 |
| 2,884,359 | 4/1959 | Bloom et al. | 203/52 |
| 2,884,361 | 4/1959 | Bloom et al. | 203/60 |
| 2,884,362 | 4/1959 | Bloom et al. | 203/80 |
| 2,884,363 | 4/1959 | Bloom et al. | 203/57 |
| 2,885,420 | 5/1959 | Spiegler | 260/453 SP |

*Primary Examiner*—Wilbur L. Bascomb, Jr.
*Attorney*—Melville J. Hayes

[57] ABSTRACT

Organic isocyanates can be recovered with beneficial ease and efficiency from crude isocyanate compositions containing tar (residue component) and other contaminants (e.g., compositions as obtained by phosgenation of an amine in a solvent) by a process which includes adding a suitable amount of a useful tar-thinning agent and distilling the resulting mixture either batchwise or continuously in the presence of a stripping agent so that the distillate contains most of the organic isocyanate and the still heel contains the tar and tar-thinning agent.

8 Claims, 2 Drawing Figures

Patented April 24, 1973

3,729,386

INVENTORS
CARL FRANCIS IRWIN
WILLIAM THOMAS MUNCASTER

ORGANIC ISOCYANATE RECOVERY PROCESS BY DISTILLATION WITH A TAR-THINNING AGENT AND A STRIPPING AGENT

CROSS-REFERENCE TO RELATED APPLICATION

This is a continuation-in-part of our patent application Ser. No. 39,779 filed May 22, 1970 (now abandoned).

BACKGROUND OF THE INVENTION

This invention relates to a process for recovering organic isocyanates from crude organic isocyanate compositions including those obtained by phosgenation of an amine in a solvent.

Organic isocyanates such as toluene diisocyanate (TDI) are known to be useful in the manufacture of flexible and rigid polyurethane foams. They can be produced by the phosgenation of a primary amine corresponding to the desired isocyanate at an elevated temperature in an inert high boiling solvent. The phosgenation reaction yields a crude organic isocyante solution including solvent, tar, and minor amounts of phosgene and hydrochloric acid. The word "tar" is often used by workers in the art to mean the substantially nonvolatile residue component which forms the still heel after distilling off the volatile impurities and the isocyanate.

A commercial process for recovering isocyanates from the crude organic isocyanate solutions involves the sequential distillation of the crude solution to remove the minor amounts of phosgene and hydrochloric acid, the solvent, and then the organic isocyanate, leaving as a distillation heel a viscous, tarry material still containing a substantial amount of isocyanate. This distillation heel can contain as much as 30 to 50 percent by weight of organic isocyanate.

It has usually been considered economically impractical to reduce the concentration of isocyanate in this tarry heel by ordinary distillation methods. Attempted distillation of isocyanate from the tarry heel in conventional equipment is a slow process; column bottoms are often held up for periods of about 8 hours at high temperatures. During such periods, considerable polymerization and degradation can take place, resulting in an increase in viscosity which can cause deposition of a solid material on the walls of pipes and tanks. The problem becomes worse as the tarry heels are further processed to recover additional isocyanate. This procedure results in losses of substantial amounts of isocyanate formed during the phosgenation step, and requires frequent equipment shutdowns for cleaning. Mechanically assisted evaporators, such as wiped film evaporators, have been employed in an attempt to efficient recovery of residual organic isocyanate from the tarry heel. Such mechanically assisted evaporators are, however, extremely expensive.

U.S. Pat. No. 2,680,128 suggests the distillation of crude isocyanate in the presence of a plasticizing agent to increase the yield. The distillation temperature needed to obtain a desirable yield, however, is relatively high; thus, the distillation heel tends to polymerize and solidify. The solidified heel is unmanageable, difficult to remove from the process equipment, and frequently results in equipment blockage.

There is, therefore, a need for an efficient and inexpensive method for recovering organic isocyanate from the crude organic isocyanate solution whereby one can reduce the amount of isocyanate lost in the recovery process, obtain a manageable residue after the recovery of isocyanate, and avoid equipment blockage.

SUMMARY OF THE INVENTION

The present invention provides an organic isocyanate recovery process which comprises A. providing a crude organic isocyanate composition containing a substantially nonvolatile residue component as an impurity,
B. adding to said isocyanate composition a tar-thinning agent in an amount such that the weight ratio of tar-thinning agent to said residue component in the resulting mixture is about 0.2/1 to 5/1, the tar-thinning agent being an organic liquid which dissolves the residue component and has a boiling point at least 50°C. above that of the organic isocyanate component, and
C. subjecting the resulting mixture to distillation conditions in the presence of a stripping agent for the organic isocyanate whereby the distillate contains a major proportion of the organic isocyanate and the still heel contains the residue component and the tar-thinning agent.

DESCRIPTION OF PREFERRED EMBODIMENTS

In certain preferred embodiments of the present process, the crude composition provided in Step (A) is a composition resulting from the preparation of an organic isocyanate by the phosgenation of an amine in an organic solvent; the composition contains said solvent plus a small amount of phosgene and hydrochloric acid as impurities; and the phosgene and hydrochloric acid are removed from the composition by distillation, for example, in the presence of a stripping agent prior to Step (B).

It is known that "stripping" procedures sometimes comprise removal of volatile components from a composition by passing a gas through it, and sometimes they comprise adding to the composition a volatile liquid which codistills with the volatile components already in the composition.

Figure 1:
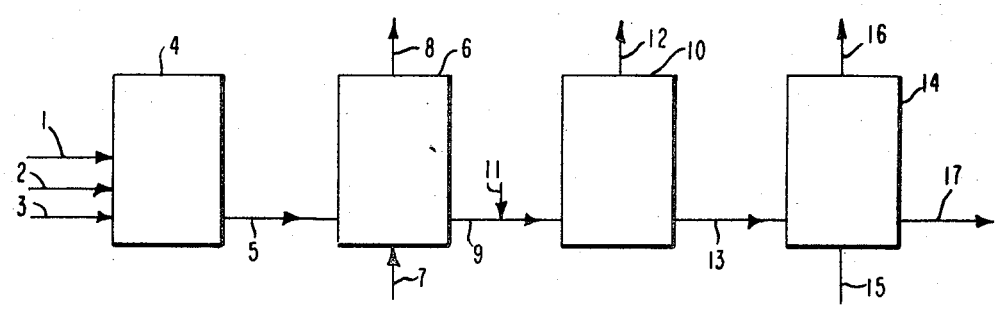
FIG. 1 is a flow sheet diagram showing (as described in detail below) the steps of preparing a crude organic isocyanate, distilling to remove phosgene and hydrochloric acid, adding a tar-thinning agent, distilling to remove the solvent, and stripping isocyanate from the distillation heel.
Figure 2:
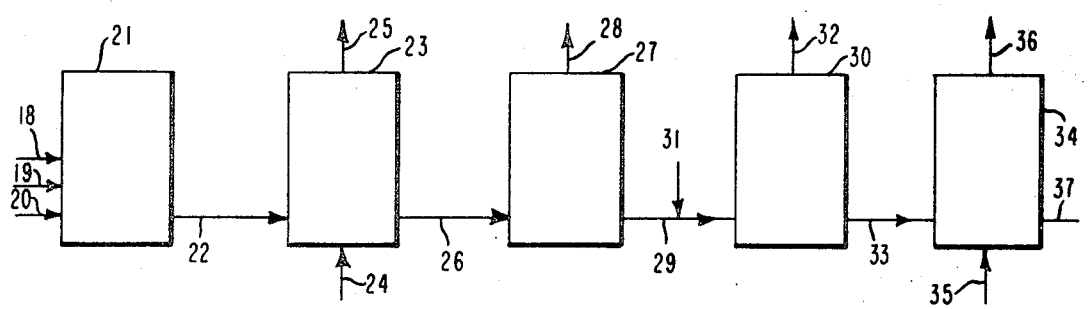
FIG. 2 is a flow sheet diagram of a preferred embodiment showing the steps of preparing a crude organic isocyanate, distilling to remove phosgene and hydrochloric acid and then the solvent, adding a tar-thinning agent, distilling off the bulk of the isocyanate, and stripping isocyanate from the remaining distillation heel.

We usually prefer to remove the solvent from the composition by distillation prior to Step (B) as shown in FIG. 2. However, it can also be removed just after Step (B) as shown in FIG. 1.

In one very useful embodiment of the process, the organic isocyanate is toluene diisocyanate and the solvent to be removed is orthodichlorobenzene.

Among the most useful tar-thinning agents are aromatic hydrocarbons having less than 35 weight percent saturates, esters of aromatic acids having alcohol radicals of $C_1-C_{12}$, aromatic ketones having the carbonyl radical linked to two aryl radicals, aromatic ethers having the ether oxygen linked to two aryl radicals, and blends of two or more such materials. Especially preferred is an aromatic petroleum oil having less than 35 weight percent saturates. Also useful are fully aromatic sulfides such as diphenyl sulfide, and fully aromatic sulfones such as diphenyl sulfone. If the boiling point of the tar-thinning agent is not enough greater than that of the isocyanate, an excessive amount of the thinning agent is distilled with the isocyanate. Some of the best thinning agents have a boiling point at least 100°C. above that of the isocyanate at atmospheric pressure. Useful tar-thinning agents are illustrated as follows:

Representative aromatic hydrocarbons include α-phenylnaphthalene and its mixtures with β-phenylnaphthalene, low melting grades of polystyrene, isomeric mixtures of terphenyl and substituted derivatives of these hydrocarbons containing chloro-, bromo-, alkyl, alkoxy, or nitro- groups. A particularly preferred class of aromatic hydrocarbons are highly aromatic petroleum oils which are often used as rubber process oils or rubber extending oils. To be useful in the present process, the petroleum oils should contain less than 35 percent, and preferably less than 15 percent, by weight of "saturates" as determined by the Clay-Gel method of molecular analysis (ASTM D–2007). This analysis is commonly used to characterize petroleum oils and such information is usually available from suppliers of such oils.

Representative esters of aromatic acids where the alcohol radicals contain one to 12 carbon atoms include diisooctyl phthalate, diethyl phthalate, trioctyl trimellitate, diisobutyl terephthalate, diethylene glycol dibenzoate and phenyl benzoate. Esters of aromatic acids substituted with chloro, bromo, alkyl, alkoxy, or nitro groups can also be used. Phthalate esters are preferred because they are readily available and economical to use.

The aromatic ketones should be fully aromatic in that the carbonyl radical of the ketone is linked to two aryl radicals. Representative ketones include benzophenone, α- and β-naphthyl phenyl ketones and derivatives substituted as described for the esters.

The aromatic ethers should be fully aromatic in that the ether oxygen is linked to two aryl radicals. Representative compounds include α- and β-naphthyl phenyl ethers, diphenoxybenzene isomer mixtures, lower polyphenyl ethers and derivatives substituted as described for the esters.

When using a blend of two or more thinning agents, the initial boiling point of the blend should be at least 50°C. above that of the isocyanate. A thinning agent is used which does not undergo any harmful decomposition or harmful reactions under the process conditions with the other materials present.

In many cases we prefer that the weight ratio of tar-thinning agent to residue component is about 0.7/1 to 1.5/1. The best ratio to use in a particular application depends on such factors as the nature of the thinning agent and the isocyanate components, the extent of isocyanate recovery required, and the still heel viscosity desired.

Step (C) is preferably carried out at a temperature of about 100°–180°C. and a pressure of about 0.5–50 mm. Hg. In some embodiments, the stripping agent used in removing the phosgene and hydrochloric acid is nitrogen, the stripping agent used in removing the organic isocyanate in Step (C) is orthodichlorobenzene, and Step (C) is carried out at a temperature of about 130°–165°C. and a pressure of about 2–20 mm. Hg.

The stripping agents used in the isocyanate stripping still are usually lower boiling that the isocyanate being recovered, and preferably are sufficiently lower boiling to be separated easily from the isocyanate being recovered. In addition, these agents (like the thinning agents) should not undergo any harmful reactions under the process conditions. Representative materials are gases such as nitrogen and carbon dioxide; low boiling solvents such as benzene, hexane, carbon tetrachloride; and higher boiling solvents such as toluene, chlorobenzene, and o-dichlorobenzene. Solvents suitable for phosgenation are particularly economical to use in commercial operation of this process as only one solvent is required for phosgenation and stripping. In addition, such solvents are usually readily condensed along with recovered isocyanate during codistillation.

Step (C) can be carried out as a batch procedure; or it can be performed as a continuous procedure. For example, Step (C) can comprise passing a continuous stream of the mixture obtained in Step (B) and the stripping agent into distillation means capable of continuously removing a major proportion of the organic isocyanate, and passing a continuous stream of the distilled isocyanate and stripping agent out of the distillation means. One skilled in the art, after reading the present disclosure, will be able to select for a particular application the distillation means and conditions suitable for use in the continuous procedure as well as in the batch procedure. Thus, one can carry out the Step (C) stripping operation continuously by employing a plurality of counter-current and/or co-current stages. The counter-current stages can employ such counter-current strippers as distillation columns, falling-film evaporators, and vacuum stripping vessels operated counter-currently. The co-current stages can employ such co-current strippers as two or more vacuum stripping vessels operated co-currently, or turbannular strippers. The latter can be used in combination with jacketed kettles; the vapor and liquid from the stripper enter near the top of the kettle and the vapors flow to a condenser for recovery. The liquid in the bottom of the kettle can be further reduced in isocyanate content be feeding additional stripping agent to the bottom of the kettle. Continuous stripping is especially preferred when it is important to use the least possible amount of stripping agent based on the amount of isocyanate recovered.

Referring to the diagram shown in FIG. 1 toluene diamine, phosgene, and an organic solvent such as orthodichlorobenzene (ODCB), are fed through conduits 1, 2, and 3, respectively, into a conventional phosgenation reactor 4. The phosgenation reaction product consists mainly of TDI (toluene diisocyanate), ODCB, minor amounts of phosgene and hydrochloric acid, and "tar" (as defined above). The phosgenation reaction mixture is fed through conduit 5 to a conventional stripping still 6 where the minor amounts of phosgene and hydrochloric acid are stripped away by forcing a gas such as nitrogen into stripping still 6 through conduit 7, and removing from the top of the stripping still through conduit 8 the phosgene and hydrochloric acid along with the stripping gas. After the phosgene and hydrochloric acid are removed, the remaining solution is fed through conduit 9 into a conventional solvent distillation still 10. A tar-thinning agent, namely, a highly aromatic petroleum oil having less than 15 weight percent saturates, is added to the solution through conduit 11, which joins conduit 9, and becomes a part of the solution fed into the solvent distillation still 10. In the solvent distillation still, solvent is removed through conduit 12, leaving a solution of TDI, tar, and the tar-thinning agent. This solution is fed through conduit 13 into stripping still 14; a stripping agent such as ODCB is fed into the still through conduit 15, is forced through the solution, and is removed from the stripping still through conduit 16 along with TDI. The temperature in the still is maintained at about 130° to 160°C. under a pressure of about 2 to 10 mm. of mercury. The ODCB and TDI vapors are then sent to a condenser and subsequently separated by distillation according to conventional techniques. About 98 percent of the TDI produced is recovered. The ODCB recovered can be reused by recirculating it to the phosgenation reactor 4. The material remaining in the bottom of the still contains about 9% TDI, 45.5 percent tar and about 45.5 percent tar-thinning agent. This material has a viscosity of less than 1,000 centipoises at 130° C. when formed, and a viscosity of about 2,500 centipoises two hours after withdrawal from the stripping still 14 through conduit 17; it can be further processed to recover metatoluene diamine.

In the flow sheet diagram of FIG. 2, representing a preferred embodiment, toluene diamine, phosgene and an organic solvent such as ODCB are fed through conduits 18, 19 and 20 into a conventional phosgenation reactor 21. The phosgenation reaction product is fed through conduit 22 into a conventional stripping still 23 where phosgene and hydrochloric acid are removed by stripping; this is accomplished by forcing a gas such as nitrogen through conduit 24 and through the solution, and removing from the top of the still through conduit 25 phosgene, hydrochloric acid and nitrogen gas. The remaining solution is fed through conduit 26 into a conventional solvent distillation still 27 where ODCB is removed from the top of the still through conduit 28. The remaining solution is composed of about 90% TDI and 10 percent residue component. The solution is fed through conduit 29 into a conventional TDI distillation still 30. A tar-thinning agent, (e.g., a highly aromatic petroleum oil having less than 15 weight percent saturates) is added through conduit 31, which feeds it into line 29 and mixes it with the solution before it enters the TDI distillation still 30. In distillation still 30, about 90 percent of the TDI produced is removed from the top through conduit 32, leaving a still heel composed of about 33% TDI, 33 percent tar, and 34 percent tar-thinning agent. The still heel is fed through conduit 33 into stripping still 34 where a stripping agent such as ODCB is fed through the heel and is removed from the top through conduit 36 along with TDI. The solution remaining in the bottom of still 34 is composed of about 9% TDI, 45.5 percent tar, and 45.5 percent tar-thinning agent; it is pumped from the stripping still through conduit 37 and is further processed to recover metatoluene diamine. The total amount of isocyanate recovered is about 98 percent of that produced.

The process shown in in FIG. 2 can be modified if desired by passing the still heel from conduit 33 through a short residence time heat exchanger which is maintained under superatmospheric pressure, and heating the still heel just before it enters still 34 so that most of the TDI in the heel will vaporize and distill about the same instant the heel enters the still.

The use of a tar-thinning agent in accordance with this invention adds versatility to the process of recovering isocyanates as evidenced by the above embodiments. In the first embodiment as shown in FIG. 1, the tar-thinning agent maintains the crude organic isocyanate composition as a solution, and the process proceeds without difficulty by the steps of fractionally distilling the minor amounts of phosgene and hydrochloric acid, and then the solvent; and then removing about 98 percent of the isocyanate in a stripping still, leaving a pumpable tar that is easy to manage.

In the preferred embodiment shown in FIG. 2, the tar-thinning agent maintains the crude organic isocyanate composition as a solution, and the process proceeds without difficulty by the steps of removing the minor amounts of phosgene and hydrochloric acid, and then the solvent; and then much of the isocyanate is removed by practical distillation techniques which permit the recovery at this stage of about 90 percent of isocyanate prepared. Polymerization of the distillation heel is minimized due to the presence of the tar-thinning agent; this permits the distillation heel to be further processed by feeding it to a stripping still where additional isocyanate is recovered, giving an overall yield of about 98 percent. Furthermore, the still heel has a low enough viscosity so that it is easy to remove and to process further.

The use of a tar-thinning agent in combination with the isocyanate stripping still provides an improved process for recovering isocyanates, resulting in increased yields of isocyanates, and leaving a still heel which has a relatively low viscosity and is easy to remove from the still. By stripping isocyanate from the crude reaction mass instead of recovering it by fractional distillation, lower temperatures can be used; this reduces the amount of polymerization that takes place in the still heel, and results in a lower heel viscosity. The lower the viscosity of the tar the greater the amount of entrapped organic isocyanate recovered. There is a point, however, where the addition of more tar-thinning agent is more costly than the gain received from recovering a little more isocyanate. In the FIG. 2 embodiment, the addition of the tar-thinning agent just prior to the removal of the bulk of the isocyanate in the TDI still reduces the residence time in the still and dilutes the heel, making it very manageable for further processing in the stripping still.

When the high-boiling tar-thinning agent does not undergo hydrolysis and is inert toward aromatic amines as is the case with the preferred aromatic petroleum oils, the still heels from this process can be readily hydrolyzed to recover diamines which can be returned to the phosgenation step. For example, one can employ hydrolysis with water in a pressure vessel as disclosed in German Pat. No. 1,013,281; or hydrolysis with superheated steam as disclosed in U.S. Pat. No. 3,225,094. Following hydrolysis, the diamines can be separated from the tar-thinning agent by distillation or other conventional separation procedures.

Among the isocyanates which can be recovered by the process of this invention are: aromatic isocyanates containing 7–12 carbon atoms; aliphatic isocyanates containing 7–14 carbon atoms; and cycloaliphatic isocyanates containing 7–15 carbon atoms. Representative examples of aromatic isocyanates containing 7–12 carbon atoms include: 1,3- and 1,4-phenylene diisocyanates, 2,4- and 2,6-tolylene diisocyanates, 3,4-dichlorophenyl isocyanate, o-, m- and p-tolyl isocyanates, α- and β-naphthyl isocyanates, 1,4 and 1,5naphthylene diisocyanates, durene diisocyanate, and 4-isopropylphenyl isocyanate.

Representative aliphatic isocyanates containing 7–14 carbon atoms include: 1,6-hexamethylene diisocyanate, α,α'-xylylene diisocyanate, 1,12-dodecamethylene diisocyanate, dodecyl isocyanate, lysine diisocyanate, and β,β'-diisocyanatodiethyl carbonate.

Representative cycloaliphatic isocyantes containing 7–15 carbon atoms include: cyclohexyl isocyanate, 1,3- and 1,4-cyclohexylene diisocyanates, 1-methyl-2,4- and 2,6-cyclohexylene diisocyanates, 4,4'-methylenebis (cyclohexyl isocyanate), and 4-phenylcyclohexyl isocyanate.

This invention is illustrated further by the following examples. All amounts are by weight unless otherwise indicated.

EXAMPLE 1

A crude solution of TDI (toluene diisocyanate) is prepared by the phosgenation of m-tolylene diamine in ODCB (orthodichlorobenzene). The crude solution is subjected to a fractional distillation process to remove minor amounts of phosgene and hydrochloric acid, and then ODCB. The heel is a liquid containing about 88 percent distillable diisocyanate (80 percent 2,4-isomer and 20 percent 2,6-isomer) and 12 percent nonvolatile residue.

The heel is first mixed with ODCB as a stripping agent. There are 167 parts of heel and 620 parts of ODCB present. This mixture is added to an agitated, vacuum stripping still containing 20 parts of a petroleum oil; there is one part of tar-thinning agent per part of residue. The addition is uniformly made over a period of about 3 hours. The petroleum oil has an initial boiling point of 393°C. (boiling point of TDI being 250°C.) and a molecular analysis by the Clay-Gel method (ASTM D-2007) of 23 percent polar compounds, 70.3 percent aromatics, and 6.7 percent saturates.

The stripping still is operated about 160°C. under a pressure of 10 mm. Hg., and 143.4 parts of TDI are stripped and recovered. This corresponds to a recovery of 97.5 percent of the volatile diisocyanate available in the starting crude solution. The heel remaining after the stripping process is fluid at 140°C. and is easily removed from the stripping still by pouring.

EXAMPLE 2

A crude solution of TDI is prepared by the phosgenation of m-tolylene diamine in ODCB. The crude solution is subjected to a fractional distillation process to remove minor amounts of phosgene and hydrochloric acid, and then the ODCB. The heel is a solution containing 86.4% TDI (80 percent 2,4-isomer and 20percent 2,6-isomer) and 13.6 percent nonvolatile residue.

The heel is added to an agitated vacuum stripping still containing 150 parts of an aromatic petroleum oil having an initial boiling point of 354°C. and a molecular analysis by the Clay-Gel method (ASTM D-2007) of 8.2 percent polar compounds, 78.2 aromatics and 13.6 percent saturates. The amount of petroleum oil used corresponds to 1.1 parts of oil per part of residue. The liquid in the still is maintained at 160°C. under a pressure of 10 mm. Hg. while 1,000 parts of the heel are uniformly added over a period of 90 minutes under the surface of the oil in the still.

Distillation yields 729 parts of TDI. The temperature of the liquid in the still is lowered to 130°C. and the pressure reduced to 2 mm. Hg., resulting in the distillation of 54 additional parts of TDI.

While maintaining the temperature of the liquid at 130°C. under 2 mm. Hg., 140 parts of ODCB stripping agent are added to the stripping still (under the liquid in the still) at a uniform rate over a period of 30 minutes. The ODCB and TDI are codistilled, yielding an additional 56 parts of TDI.

The total amount of TDI recovered is 839 parts out of 864 parts available representing a yield of 97 percent.

The still heel has a viscosity of 250 centipoises at 130°C. immediately after the stripping process is stopped; the viscosity increases to 1,500 centipoises at 130°C. after 2 hours.

EXAMPLE 3

Crude TDI prepared substantially as described in Example 2 containing 88% TDI and 12 percent residue is distilled to remove minor amounts of phosgene and hydrochloric acid, and then the solvent. The crude solution is then distilled at 160°C. and 10 mm. Hg. until the heel contains 47.8% TDI and 52.2 percent nonvolatile residue. Then 100 parts of the heel and 45 parts of the petroleum oil described in Example 2 are placed in an agitated vacuum stripping still; there is 0.86 part of tar-thinning agent per part of residue. The pressure is reduced to 2 mm. Hg. and the temperature is adjusted to 130°C., resulting in the distillation of 11.6 parts of TDI. While maintaining the temperature at 130°C. and the pressure at 2 mm. Hg., 14.4 parts of ODCB are added over about 30 minutes at a uniform rate. An additional 17.2 parts of TDI are codistilled with ODCB. Immediately after the stripping, the still heel is an easily managed liquid having a viscosity of 125 cps. at 130°C. After 2 more hours at 130°C., the viscosity increases to 750 cps. at 130°C. The total amount of TDI recovered represents a yield of about 95.2 percent.

EXAMPLE 4

Crude TDI is processed as described in Example 2 to remove minor amounts of phosgene and hydrochloric acid and then the solvent. The remaining crude solution is further distilled at 160°C. and about 10 mm. Hg. until the heel contains 37.2% TDI and 62.8 percent nonvolatile residue. Then 100 parts of heel and 13 parts of diisooctyl phthalate are placed in an agitated vacuum stripping still (0.21 parts of tar-thinning agent per part of residue), and the temperature is adjusted to 130°C. at a pressure of 2 mm. Hg., resulting in the distillation of 5.5 parts of TDI. While maintaining the still at 130°C. and 2 mm. Hg., 8.9 parts of stripping agent (ODCB) are added at a uniform rate over about 15 minutes, resulting in the codistillation of an additional 9.5 parts of TDI. The resulting still heel is an easily managed liquid having a viscosity of 170 cps. at 140°C. immediately after the stripping is completed. After 2 hours at 140°C., the viscosity increases to about 3,000 cps. at 140°C. The total amount of TDI recovered represents a yield of about 95.2 percent.

We claim:

1. An organic isocyanate recovery process which comprises
   A. providing a crude organic isocyanate composition containing a substantially nonvolatile residue component as an impurity, said crude composition being one (1) which has resulted from the preparation of an organic isocyanate by the phosgenation of an amine in an organic solvent, (2) which contains said solvent and had contained a small amount of phosgene and hydrochloric acid as impurities, and (3) which has had the phosgene and hydrochloric acid removed by distillation,
   B. mixing with said isocyanate composition a tar-thinning agent in an amount such that the weight ratio of tar-thinning agent to said residue component in the resulting mixture is about 0.2/1 to 5/1, the tar-thinning agent being an organic liquid which dissolves the residue component and has a boiling point at least 50°C. above that of the organic isocyanate component, and the tar-thinning agent also being at least one liquid selected from the group: aromatic hydrocarbons having less than 35 weight percent saturates, esters of aromatic acids having alcohol radicals of $C_1$–$C_{12}$, aromatic ketones having the carbonyl radical linked to two aryl radicals, and aromatic ethers having the ether oxygen linked to two aryl radicals, and
   C. subjecting the resulting mixture to distillation conditions in the presence of a stripping agent for the organic isocyanate whereby the distillate contains a major proportion of the organic isocyanate and the still heel contains the residue component and the tar-thinning agent.

2. A process according to claim 1 wherein said solvent is removed from the resulting composition by distillation prior to Step (B).

3. A process according to claim 1 wherein the organic isocyanate is toluene diisocyanate and said solvent is orthodichlorobenzene.

4. A process according to claim 1 wherein the tar-thinning agent is an aromatic petroleum oil having less than 35 weight percent saturates.

5. A process according to claim 1 wherein the weight ratio of tar-thinning agent to residue component is about 0.7/1 to 1.5/1.

6. A process according to claim 1 wherein Step (C) is carried out at a temperature of about 100°–180°C. and a pressure of about 0.5–50 mm. Hg.

7. A process according to claim 6 wherein a stripping agent is used in removing the phosgene and hydrochloric acid, the stripping agent used in removing the organic isocyanate in Step (C) is orthodichlorobenzene, and Step (C) is carried out at a temperature of about 130°–165°C. and a pressure of about 2–20 mm. Hg.

8. A process according to claim 1 wherein Step (C) is carried out by passing a continuous stream of the mixture obtained in Step (B) and the stripping agent into distillation means capable of continuously removing a major proportion of the organic isocyanate, and passing a continuous stream of distilled isocyanate and stripping agent out of the distillation means.

* * * * *